United States Patent

Singh et al.

[11] Patent Number: 6,143,358
[45] Date of Patent: *Nov. 7, 2000

[54] HYDROPHOBIC THIN FILMS ON MAGNESIUM FLUORIDE SURFACES

[75] Inventors: Brij P. Singh; Pramod K. Arora, both of North Royalton, Ohio

[73] Assignee: nanoFILM, Ltd., Valley View, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/164,489

[22] Filed: Oct. 1, 1998

[51] Int. Cl.$^7$ ........................................................ B05D 5/06
[52] U.S. Cl. .......................... 427/162; 427/302; 427/314; 427/387; 427/407.1; 427/419.5
[58] Field of Search ............................ 359/580; 427/162, 427/399, 314, 387, 389.7, 164, 165, 407.1, 407.2, 419.2, 419.5, 302

[56] References Cited

U.S. PATENT DOCUMENTS

| | | |
|---|---|---|
| 3,034,916 | 5/1962 | Eshner . |
| 4,765,729 | 8/1988 | Taniguchi .............................. 359/580 |
| 5,300,561 | 4/1994 | Singh et al. .............................. 524/765 |
| 5,766,698 | 6/1998 | Singh et al. .............................. 427/601 |

OTHER PUBLICATIONS

Wojciechowski, Maria, "Magnesium Fluoride Promoted by Different Inorganic Acids," Bull. Acad. Pol. Sci., Ser. Sci. Chim., 28, 237–47 (1980) (no mo.).

Wojciechowski, Maria, "Modification of Magnesium Fluoride Surface by Impregnation with Oxo–Acids," Bull. Acad. Pol. Sci., Ser. Sci. Chim., 29, 549–62 (1981) (no mo.).

Zukic, Muamer et al, "Vacuum ultraviolet thin films. 1: Optical constants of, etc." Appl. Opt., vol. 29, No. 28, 4284–92 (1990) (no mo.).

Catalan, L.A. et al, "Study of the Performance of Dielectric Thin Film Beam Dividing Systems," Brit. J. Appl. Phys., vol. 12, 499–502 (1961) (no mo.).

*Primary Examiner*—Janyce Bell
*Attorney, Agent, or Firm*—Jones, Day, Reavis & Pogue

[57] ABSTRACT

A magnesium fluoride surface having a thin film of amphiphilic molecules bonded thereto by way of a primer film of a metal oxide having a surface that hydrolyzes on exposure to airborne moisture. The amphiphilic molecules are chemically bonded to hydroxy groups on the hydrolyzed surface of the metal oxide primer film.

11 Claims, 1 Drawing Sheet

HYDROPHOBIC THIN FILMS ON MAGNESIUM FLUORIDE SURFACES

BACKGROUND OF THE INVENTION

This application relates to the art of bonding hydrophobic thin films of amphiphilic molecules to substrate surfaces for protection against abrasion and stains. The invention is particularly applicable to the bonding of such films to magnesium fluoride antireflection coatings by way of a metal oxide primer film and will be described with particular reference thereto. However, it will be appreciated that the invention has broader aspects and can be used to bond hydrophobic films to other substrates having surface characteristics that are unfavorable to realization of a good bond with amphiphilic molecules.

The properties of magnesium fluoride include low chemical reactivity, a low refractive index, good scratch resistance, good weatherability and mild reaction to high energy radiation. Because of these properties, magnesium fluoride is used extensively as an antireflection and protective coating on surfaces of optical devices that are made of glass. The magnesium fluoride coating increases light transmission through the optical surface to which it is applied by minimizing light reflection. Examples of optical devices to which magnesium fluoride antireflection films are applied include eyewear lenses, sunglasses, binocular, microscope and telescope lenses, video terminal and television screens, liquid crystal displays, mirrors, prisms and optical surfaces of precision instruments.

Unfortunately, despite its excellent antireflection and protective properties, magnesium fluoride is not without faults as an antireflection coating. The surface of a magnesium fluoride antireflection coating is porous and behaves like a hydrophilic surface with an affinity for dirt and oils. This stains the surface, and distorts and reduces light transmission through the optical device. Frequent cleaning is required to preserve optical clarity, and this promotes the formation of scratches on the optical surface.

Staining of optical surfaces by dirt and oils can be minimized by applying a thin film of amphiphilic molecules that is hydrophobic and that seals the pores in the optical surface. The hydrobophic film provides a slippery and anti-stick surface that also is abrasion resistant without changing the color or reflection properties of the substrate to which it is applied. However, the surface of a magnesium fluoride antireflection coating is chemically inert, and this makes it extremely difficult to attach a hydrophobic film of amphiphilic molecules. The inventors are not aware of any published reports of a hydrophobic film of amphiphilic molecules attached to the surface of a magnesium fluoride antireflection coating.

Research has been reported on the coating of magnesium fluoride surfaces with metal oxides, metal oxo-acids and other metals. The coating is provided to change the antireflection properties of the magnesium fluoride layer or to activate the surface of the magnesium fluoride. Examples of publications that discuss such coatings, the disclosures of which are hereby incorporated herein by reference, are as follows: U.S. Pat. No. 3,034,916 issued May 15, 1962; Wojciechwska, M., Bull. Acad. Pol. Sci., Ser. Sci. Chim., 28, 237–47 (1980); 29, 549–62 (1981); Zukic, M. et al, Appl. Opt., 29, 4284–92 (1990); Catalan L. A. et al, Brit. J. Appl. Phys., 12, 499–502 (1961).

The prior methods for applying a coating of metal oxide to magnesium fluoride surfaces use very high temperatures, strong vacuums and require soaking and/or baking for a very long time. The prior methods do not control the thickness of the metal oxide coating, and a thick coating will undesirably change the reflection characteristics of an optical surface to which it is applied.

It would be desirable to be able to coat magnesium fluoride surfaces with a hydrophobic film of amphiphilic molecules to provide resistance against abrasion and staining.

SUMMARY OF THE INVENTION

In accordance with the present application, magnesium fluoride surfaces are coated with a hydrophobic film of amphiphilic molecules by way of a primer coating of a metal oxide having a surface that is hydrolyzed in the presence of airborne moisture to form hydroxy groups that react with the amphiphilic molecules.

In accordance with the present application, the surface of a magnesium fluoride substrate is provided with a thin film of a metal oxide by first immersing the substrate in a metal oxo-acid solution. The substrate is removed from the solution at a slow constant speed during which the solution solvent evaporates to leave a thin film of the metal oxo-acid on the substrate surface. The uniformity and thickness of the film is controlled by the metal oxo-acid concentration in the solution, by the evaporation rate of the solvent and by the speed at which the substrate is removed from the solution.

The substrate is then baked so that the metal oxo-acid self-condenses to a metal oxide on the magnesium fluoride surface, and also bonds to the magnesium fluoride surface by reacting with surface molecules to form a composite such as metal oxyfluoride.

Following baking, the substrate is cooled to ambient temperature and exposed to an ambient atmosphere that contains moisture. The metal oxide surface is hydrolyzed by airborne moisture to form active hydroxy groups.

The hydrolyzed surface of the metal oxide is then coated with a hydrophobic thin film of amphiphilic molecules in accordance with commonly assigned U.S. Pat. Nos. 5,078,791; 5,204,126; 5,219,654; and 5,766,698; the disclosures of which are hereby incorporated herein by reference. The amphiphilic molecules self-assemble on the surface of the metal oxide film and react with the hydroxy groups to form a chemical bond.

Metal oxide primer films in accordance with the present application are those having surfaces that are hydrolyzed by airborne moisture to form hydroxy groups that react with the amphiphilic molecules. Examples of suitable metal oxides include oxides of silicon, titanium, zirconium, hafnium, chromium and aluminum. The preferred oxide is silicon dioxide.

It is a principal object of the present invention to provide a procedure for bonding a hydrophobic thin film of amphiphilic molecules to the surface of a magnesium fluoride substrate.

It is a further object of the invention to provide such a procedure that can be carried out at relatively low temperatures, and that is economical and efficient.

It is another object of the invention to provide substrate surfaces with a primer film that is reactive with amphiphilic molecules.

DESCRIPTION OF PREFERRED EMBODIMENTS

Figure 1:
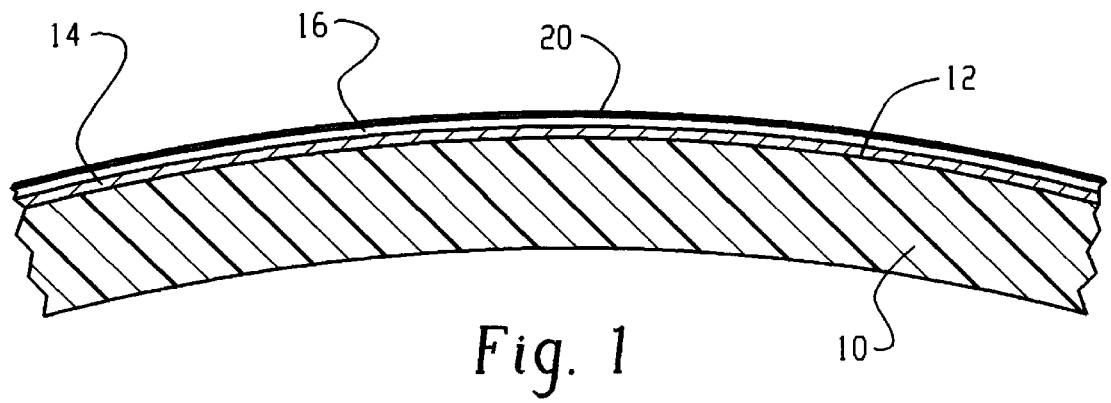
FIG. 1 is a cross-sectional elevational view of a lens coated in accordance with the present application.

Referring now to the drawing, wherein the showings are for purposes of illustrating certain preferred embodiments of the invention and not for purposes of limiting same, FIG. 1 shows a substrate in the form of a glass lens 10 having a surface 12 coated with a magnesium fluoride antireflection coating 14. A metal oxide primer film 16 is bonded to antireflective coating 14 in accordance with the present application, and a hydrophobic thin film 20 of amphiphilic molecules is bonded to primer film 16.

The metal oxide film 16 is applied by first preparing a solution of metal oxo-acid that may also contain some metal oxide that is present and soluble in the solution due to partial hydration of the metal oxo-acid. The solution is prepared from $MX_4$, where M is a metal atom selected from silicon, titanium, zirconium, hafnium, chromium, or aluminum, and where X is a halogen, alkoxy or acetoxy group. The solvent may be methanol, ethanol or isopropanol. The preferred metal atom being silicon and the preferred group being alkoxy. The catalyst may be a mineral acid such as hydrochloric or acetic acid, or a Bronsted acid. In a preferred arrangement, the metal oxo-acid is orthosilicic acid prepared using tetraethylorthosilicate in accordance with $MX_4$ where M is a silicon atom, the solvent is isopropanol, the catalyst is hydrochloric acid and water, and X is an ethoxy group.

Figure 2:
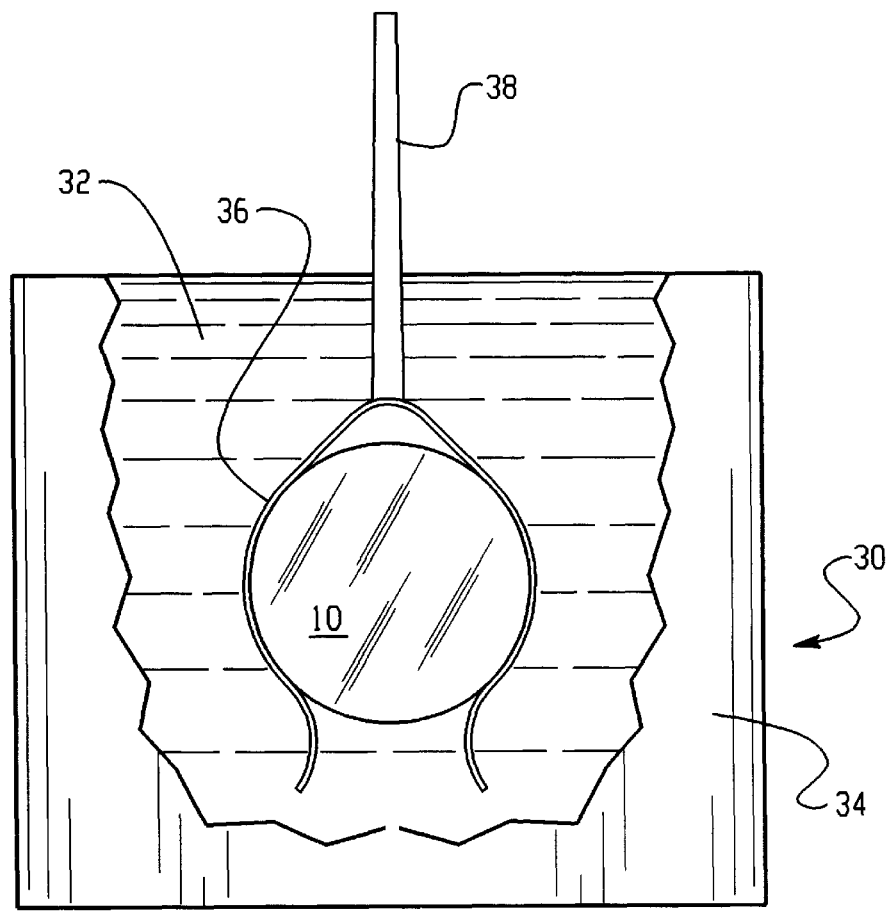
FIG. 2 is a side elevational view of a bath in which a substrate is immersed and then removed, and with portions cut-away for clarity of illustration.

FIG. 2 shows a bath 30 of a metal oxo-acid solution 32 in a receptacle 34 having an open top. Lens 10 is gripped at its periphery by a generally U-shaped holder 36 attached to an elongated handle 38. Obviously, any type of known lens holder may be used. When only one surface of the lens or other substrate is to be coated, the opposite surface is masked.

The lens with a magnesium fluoride antireflection film on a surface thereof is immersed in solution 32 and then lifted therefrom at a slow and constant rate to insure uniform wetting of the magnesium fluoride surface with a solution film of substantially uniform thickness. The lens is positioned with the surface to be coated extending generally perpendicular to the surface of the solution so that the lens surface to be coated progressively exits the solution surface as the lens is lifted.

The lens is then baked at 100–500° C. for 5 minutes–3 hours during which the metal oxo-acid self condenses to metal oxide and also attaches to the magnesium fluoride surface. This provides a glass-like primer film of metal oxide on the magnesium fluoride film.

The lens is then slowly cooled at ambient temperature and exposed to ambient air that has a relative humidity of at least 50% for a minimum time of 10–20 minutes. The surface of the metal oxide is hydrolyzed to form hydroxy groups upon exposure to the airborne moisture, and this provides a surface that is chemically very active.

The active metal oxide surface is then coated with a substance containing amphiphilic molecules which are allowed to self-assemble into a substantially continuous hydrophobic thin film and to chemically bond to the hydroxy groups. The lens is then washed in an ultrasonic bath of soap and water followed by rinsing and drying.

Film forming substances used to form hydrophobic film 20 are those containing amphiphilic molecules that are capable of self-assembly, self-polymerization and chemical bonding to the chemical groups on the metal oxide surface to form a substantially continuous ultra thin film of substantially uniform thickness. An amphiphile contains a polar region and a non-polar region, the polar segment of the amphiphile can be a silane or silane derivatives. The non-polar or apolar component typically consists mainly of alkyl or partial and per fluorinated alkyl groups, alkyl ether or partial and per fluorinated alkyl ether groups, and also may include diacetylene, vinyl-unsaturated or fused linear or branched aromatic rings.

In one preferred arrangement, the film forming substance consists essentially of $R_mSiX_n$ where the non-polar R is an alkyl, fluorinated alkyl, alkyl ether or fluorinated alkyl ether of about 1–30 carbon atoms and most preferably about 6–20 atoms. The alkyl chain may contain the diacetylene, vinyl-unsaturated, single aromatic and fused linear or branched aromatic rings. In the formula, X is selected from the group consisting essentially of halogens, hydroxy, alkoxy and acetoxy, m is 1–3, n is 1–3, and m+n equal 4. In still another arrangement, R may be a substituted silane or siloxane.

In one example, the metal oxo-acid primer solution was prepared from tetraethylorthosilicate (TEOS) in isopropanol. In a round bottom flask, 30 ml (134.5 mmol) tetraethylorthosilicate, 56 ml anhydrous isopropanol, 30 ml distilled water and 0.3 ml concentrated hydrochloric acid are mixed together at room temperature followed by heating at 70° C. for 30 minutes. The resulting solution is cooled and transferred to a 500 ml glass beaker for use in coating surfaces of magnesium fluoride antireflection films on lenses.

The metal oxo-acid solution can be used as prepared but more preferably is diluted with isopropanol before use. Dilution may be to a tetraethylorthosilicate concentration of $1-50\times10^{-2}$ mmols, more preferably $1-20\times10^{-2}$ mmols, and most preferably $2-10\times10^{-2}$ mmols.

The metal oxo-acid on the substrate surface is cured by baking the substrate in an oven at 100–500° C., more preferably at 200–500° C., and most preferably at 250–350° C. The baking time may be 5 minutes–3 hours, more preferably 5 minutes–1 hour, and most preferably 10–30 minutes.

By way of example, a clean and dry glass lens having a magnesium fluoride antireflection film thereon is placed in a metal holder and lowered into the metal oxo-acid solution followed by lifting out at a constant speed of 2 cm. per minute. The lens is heat cured inside an oven at 250–350° C. for 10–30 minutes during which the metal oxo-acid self-condenses to silicon dioxide and bonds to the surface of the magnesium fluoride. The lens is then cooled to room temperature at a room humidity of 50% or more to hydrolyze the metal oxide surface and provide a chemically active primer thin film on the surface of the magnesium fluoride. The lens is then coated by dipping it for one minute in a melted gel composition containing $R_mSiX_n$ amphiphilic molecules where R is an alkyl, fluorinated alkyl, alkyl ether or fluorinated alkyl ether and where the alkyl chain contains 6–20 carbon atoms, where X is halogens, alkoxy or acetoxy group, where m is 1–3, n is 1–3 and m+n equals 4. The lens is cleaned in an ultrasonic bath containing warm water and soap followed by rinsing and drying. This provides a hydrophobic ultra thin film of amphiphilic molecules on the surface of the magnesium fluoride on the lens.

As another example, a pair of glass sunglass lenses having magnesium fluoride antireflection films thereon are coated with the primer solution and cured at 300° C. for 20 minutes, as explained above. The lenses are then coated with a gel composition containing amphiphilic molecules thereby producing a hydrophobic ultra thin film that repels dirt and water and is very slippery.

As a further example, a clean and dry small plate of aluminum is coated with the primer solution by immersing and lifting, thereby leaving a metal oxy-acid thin film of uniform thickness on the surface. This film is cured on the surface by heating it inside an oven at 350° C. for 15 minutes. The plate is cooled to room temperature in air having a humidity of at least 50%. This primer coated plate is then treated with a gel composition of amphiphilic molecules to form a hydrophobic ultra thin film on it as explained above.

The improvements of the present application are also useful on substrates other than magnesium fluoride having surfaces that are not hydrolyzed to form hydroxy groups upon exposure to airborne moisture. Examples include many metals such as aluminum, copper, brass, nickel, cobalt and stainless steel.

Baking of the substrate and primer film in accordance with the present application can be done in an atmosphere of air at atmospheric pressure, and at a relatively low temperature for a relatively short time. However, it will be recognized that the present invention can be carried out in inert atmospheres, or in a vacuum, or at higher temperatures, or for longer baking times. The preferred arrangement uses the ranges given by way of example in the specification.

The thickness of the metal oxide primer film may vary depending on the type of substrate to which it is applied. In general, the primer film is as thin as possible to avoid changing the reflection characteristics of the surface to which it is applied while providing good bonding properties both to the substrate surface and to the hydrophobic thin film of amphiphilic molecules. The primer film may have a thickness of 5–10 nanometers.

In accordance with the present application, a substantially continuous thin film is one that is unbroken except for the possible presence of very minor defects or imperfections such as pinholes that are widely spaced and very few in number. A thin film of substantially uniform thickness is one that varies in thickness throughout its extent by not more than 10% and more preferably not more than 5%. A hydrophobic thin film of amphiphilic molecules is one that has a thickness that is not greater than 10 nanometers and preferably less than 5 nanometers.

In the present application, ambient temperature or room temperature means the temperature of the environment in which the work is carried out. That is, it is the temperature at which buildings usually are kept for the comfort of people who work in the building. This usually is a temperature between 15–32° C. but it will be recognized that the present invention can be carried out at temperatures outside of that range. Ambient atmosphere means the normal atmosphere that exists in buildings where people work. Where the humidity is too low, a humidified room or chamber may be used to provide an airborne humidity of at least 50%.

Although the invention has been shown and described with reference to preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. A method of providing a film of amphiphilic molecules on the surface of a magnesium fluoride substrate comprising the steps of: applying to said surface a metal oxo-acid solution that is condensable to a metal oxide film whose surface hydrolyzes in the presence of airborne moisture to form hydroxy groups; heating the substrate to condense the metal oxo-acid to a metal oxide film, cooling the substrate, exposing the metal oxide film to airborne moisture to hydrolyze the surface of the metal oxide film and form hydroxy groups thereon, applying to the metal oxide film a material containing amphiphilic molecules that react with hydroxy groups, and allowing the amphiphilic molecules to bond to the metal oxide film by reacting with the hydroxy groups on the metal oxide film and to self-assemble into a substantially continuous film.

2. The method of claim 1 wherein said step of applying a material containing amphiphilic molecules is carried out by applying a material containing $R_mSiX_n$ where R is an alkyl, fluorinated alkyl, alkyl ether or fluorinated alkyl ether in which the alkyl chain contains 6–20 carbon atoms, where X is selected from a halogen, alkoxy or acetoxy group, where m is 1–3 and n is 1–3, and where m plus n equals 4.

3. The method of claim 1 wherein said metal oxo-acid solution contains metal oxide.

4. The method of claim 1 wherein said step of applying a metal oxo-acid solution is carried out by applying a solution that contains $MX_4$ where M is selected from silicon, titanium, zirconium, hafnium, chromium or aluminum, and where X is a halogen, alkoxy or acetoxy group.

5. The method of claim 4 wherein said step of applying a metal oxo-acid solution is carried out by applying a solution that includes at least one of methanol, ethanol or isopropanol.

6. The method of claim 1 wherein said metal oxo-acid solution contains a catalyst selected from mineral acids and Bronsted acids.

7. The method of claim 1 wherein said step of applying a metal oxo-acid solution is carried out by applying a silicon oxo-acid solution.

8. The method of claim 1 wherein said step of applying a metal oxo-acid solution is carried out by applying a solution thickness that condenses to a metal oxide film thickness of 5–10 nanometers.

9. The method of claim 1 wherein said step of applying a metal oxo-acid solution is carried out by applying a solution having a metal oxo-acid concentration of $1–50 \times 10^{-2}$ mmols.

10. A method of applying a film of amphiphilic molecules to the surface of a substrate that is inadequately reactable with amphiphilic molecules to bond a thin film of amphiphilic molecules thereto by way of chemical reaction between the substrate surface and the amphiphilic molecules, said method comprising the steps of: applying to said surface a metal oxo-acid solution that is condensable to a metal oxide film whose surface hydrolyzes in the presence of airborne moisture to form hydroxy groups; heating the substrate to condense the metal oxo-acid to a metal oxide film, cooling the substrate, exposing the metal oxide film to airborne moisture to hydrolyze the surface of the metal oxide and form hydroxy groups thereon. applying to the metal oxide film a material that contains amphiphilic molecules that react with hydroxy groups, and allowing the amphiphilic molecules to bond to the metal oxide film by reacting with the hydroxy groups on the metal oxide film and to self-assemble thereon into a substantially continuous film.

11. The method of claim 10 wherein said substrate is selected from magnesium fluoride, aluminum, copper, brass, nickel, cobalt or stainless steel.

* * * * *